G. H. SLAWSON.
MUD CHAIN.
APPLICATION FILED MAY 6, 1920.
1,372,373.  Patented Mar. 22, 1921.
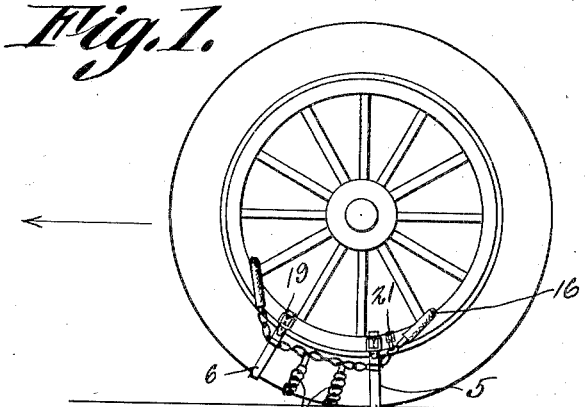
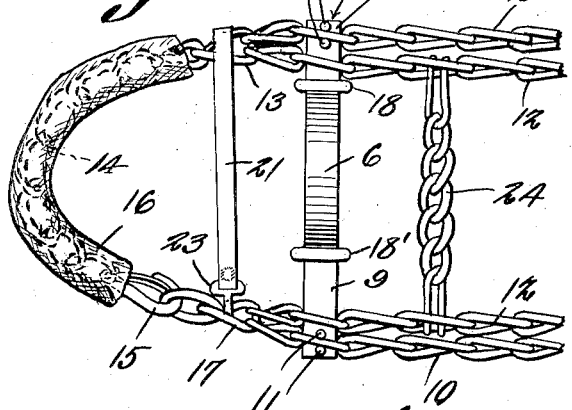
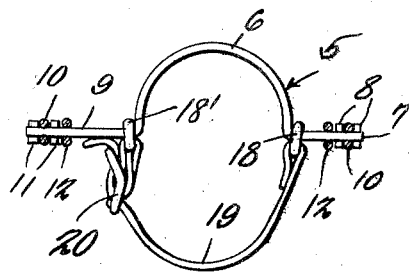
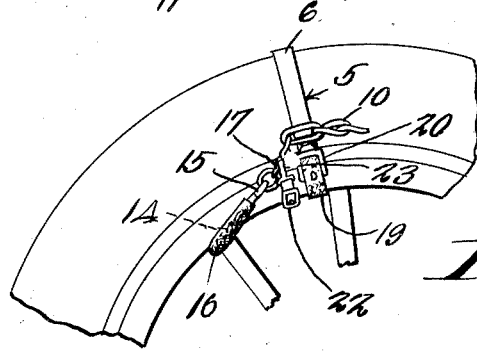
Inventor,
G. H. Slawson
By C. A. Snow & Co.
Attorneys
Witness

UNITED STATES PATENT OFFICE.

GEORGE H. SLAWSON, OF SALEM, MISSOURI.

MUD-CHAIN.

1,372,373.  Specification of Letters Patent.  Patented Mar. 22, 1921.

Application filed May 6, 1920. Serial No. 379,340.

*To all whom it may concern:*

Be it known that I, GEORGE H. SLAWSON, a citizen of the United States, residing at Salem, in the county of Dent and State of Missouri, have invented a new and useful Mud-Chain, of which the following is a specification.

This invention relates to automobile mud chains, and it is an object of the invention to provide a mud chain which will broaden the tread surface of the tire to which the device is applied, thus increasing the traction qualities of the wheel.

A further object of the invention is to provide a device of this character having a novel means to insure the proper application of the chain, thus eliminating any possibility of the chains being improperly applied, to defeat the purpose of the invention.

A still further object of the invention is to provide a novel means for securing the mud chains to the wheel in a manner to prevent the same from moving circumferentially of the wheel, when the wheel to which the device is applied is revolved.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a side elevational view of a wheel showing the invention as applied.

Fig. 2 illustrates a fragmental view disclosing one of the ends of the device in detail.

Fig. 3 illustrates an end view of the device disclosing one of the supporting members, and Fig. 4 is a fragmental detail view disclosing one end of the device as enlarged.

Referring to the drawing in detail, the device is shown as including a plurality of supporting members 5, each of which includes a curved portion 6, curved to conform to the contour of a tire to permit the same to closely engage the outer surfaces of a tire in a manner to prevent movement of the supporting members, with relation to the tire to eliminate wear on the tire.

Laterally extending arms 7 form a part of the supporting members, and each of these arms is provided with a pair of spaced lugs 8, the space between the lugs being sufficient to accommodate one of the links of the mud chain, to be hereinafter more fully described.

Disposed on the opposite side of each of the supporting members 5 is an arm 9, the arm 9 being of a length greater than the length of the arm 7 to increase the traction qualities of the chains, and to indicate which side of the supporting members extend to the outer side of the wheel to which the device is applied. From the foregoing it is only necessary to examine the supporting members and place the supporting members on the tread of the tire with the relatively long arms 9 extending toward the outer side of the wheel, which will insure the proper positioning of the chains.

As shown, these supporting members 5 are arranged in spaced relation with each other, the connecting chains 10, which are the outer chains of the device have predetermined links positioned on the arms 7 and 9, these links being disposed between the lugs 8 of the arms 7, and the lugs 11 of the arm 9, so that lateral, as well as longitudinal movement of these chains is prevented.

The inner chains 12 have predetermined links embracing portions of the arms 7 and 9, and are prevented from lateral displacement by their contact with the lugs 8 and 11.

These chains are arranged in pairs, on opposite sides of the supporting members, the forward and rear ends of one pair being connected to the links 13, which links have connection with the chains 14 which carry snap hooks 15 on the free ends thereof, the chains 14 being also housed by coverings 16, of leather or other suitable material to prevent the scarring of the wheel, to which the device is applied.

Links 17 connect the chains of the opposite pair at the ends thereof, which links provide means for receiving the snap hooks 15 of the chains 14, which in operation pass under the inner surface of the rim and contact with the spokes of the wheel for preventing movement of the device circumferentially of the wheel.

Secured to each of the supporting members by means of a link 18 is a strap 19 apertured throughout a portion of its length, which has connection with the opposite arm 9, so that the strap may be positioned over the inner surface of a rim and secured to the buckle 20 which is secured to the arm 9 through link 18', in a manner to draw the supporting members into close engagement with the surface on which the same are positioned.

Forming a part of the device, is a tightening strap indicated at 21 which strap is provided with a buckle 22 at one end thereof, and a snap hook 23, the snap hook being for the purpose of connecting the strap to the link 17 of one pair of chains, the opposite end thereof adapted to embrace a portion of the link 13 for removing the slack, which necessarily will be present in the chain 14.

Thus it will be seen that should a chain, which is constructed for use, for example on a right wheel, of a vehicle, be placed on a left wheel thereof, it would only be necessary to remove the strap 21 by releasing the snap hook 23, and buckle 22, whereupon the strap may be reversed to the opposite end of the device to take up the slack in the chain thereby eliminating the necessity of removing the chain in its entirety to insure the efficient operation thereof.

In the operation of the device, the supporting members are forced over the tread of the tire in spaced relation with each other, the straps 19 are now buckled over the inner surface of the rim. The chains 14 are now moved around predetermined spokes of the wheel, the snap hooks 15 being positioned in the end links of the opposed chains. It follows that the tightening strap 21 is now tightened around one of the chains 14 to remove the slack and eliminate any possibility of the device slipping, with relation to the tire, to which the same is applied.

It might be further stated that transversely extending chains 24 have their ends connected to the inner chains 12 of the pairs, the same being disposed in spaced relation with each other to provide additional anti-skidding devices.

What is claimed as new is:—

1. In a device of the character described, supporting members, each of said supporting members including a curved central section, laterally extending arms forming the ends of the curved section, connecting chains supported on the arms, means at the ends of the chains for securing the chains on a wheel, means having connection with each of the supporting members for supporting the supporting members on a wheel, and a tightening strap coöperating with the chains for removing the slack.

2. In a device of the character described, supporting members, each of said supporting members including a curved central section, laterally extending arms forming the ends of the central curved sections, one of the arms of each section being longer than the opposed arm thereof, connecting chains embracing portions of the arms, means on the arms and contacting with the connecting chains for preventing lateral displacement of the chains, means connecting the ends of the chains for securing the device to a wheel, means having connection with each supporting member for supporting the supporting members to the tread of a tire, and means for removing the slack from the connecting chains.

3. In a device of the character described, a plurality of supporting members, each of said supporting members having a curved section adapted to embrace a portion of a tire, means for securing the sections to a tire, connecting chains for securing the supporting members in spaced relation with each other, transversely extending chains having connection with the connecting chains, means disposed at the ends of the connecting chains for restricting movement of the supporting members circumferentially of a tire, and means for removing the slack from the connecting chains.

4. In a device of the character described, a plurality of supporting members, laterally extending arms forming a part of each supporting member, a pair of chains having connection with each arm, means on the arms and contacting with the chains for preventing lateral displacement of the chains, means for securing the supporting members to a tire, means for preventing movement of the supporting members circumferentially of the tire, and transversely extending chain members connecting the chains of each pair.

In testimony that I claim the foregoing as my own, I have hereto affixed my signature in the presence of two witnesses.

GEORGE H. SLAWSON.

Witnesses:
  J. C. TURNER,
  S. W. DOWNING.